United States Patent
Catrein et al.

(10) Patent No.: US 8,842,823 B2
(45) Date of Patent: Sep. 23, 2014

(54) TECHNIQUE FOR DETERMINING USAGE OF ENCRYPTED MEDIA CONTENT

(75) Inventors: Daniel Catrein, Würselen (DE); Markus Kampmann, Aachen (DE); Thomas Rusert, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/394,076

(22) PCT Filed: Sep. 9, 2009

(86) PCT No.: PCT/EP2009/006544
§ 371 (c)(1),
(2), (4) Date: Mar. 29, 2012

(87) PCT Pub. No.: WO2011/029457
PCT Pub. Date: Mar. 17, 2011

(65) Prior Publication Data
US 2012/0189116 A1    Jul. 26, 2012

(51) Int. Cl.
| | |
|---|---|
| *H04L 29/06* | (2006.01) |
| *H04L 29/08* | (2006.01) |
| *H04N 21/4623* | (2011.01) |
| *H04L 9/08* | (2006.01) |
| *H04N 21/266* | (2011.01) |
| *H04N 21/442* | (2011.01) |
| *G06F 21/60* | (2013.01) |
| *H04H 60/23* | (2008.01) |
| *H04N 21/6334* | (2011.01) |
| *G06F 21/10* | (2013.01) |

(52) U.S. Cl.
CPC ......... *H04L 63/062* (2013.01); *H04L 2209/603* (2013.01); *H04L 2209/60* (2013.01); *H04L 67/06* (2013.01); *H04N 21/4623* (2013.01); *H04L 9/088* (2013.01); *G06F 2221/2107* (2013.01); *H04L 2463/101* (2013.01); *H04N 21/26613* (2013.01); *H04N 21/44204* (2013.01); *G06F 21/602* (2013.01); *H04H 60/23* (2013.01); *H04L 2463/062* (2013.01); *H04N 21/63345* (2013.01); *G06F 21/10* (2013.01); *H04L 63/065* (2013.01)
USPC .......................................................... 380/28

(58) Field of Classification Search
USPC ........................................................ 380/28
See application file for complete search history.

(56) References Cited

U.S. PATENT DOCUMENTS 6,526,144 B2 * 2/2003 Markandey et al. ............ 380/28
(Continued)

FOREIGN PATENT DOCUMENTS

WO       2004021707 A1      3/2004

OTHER PUBLICATIONS

Yin, Hao, et al. "TrustStream: A secure and scalable architecture for large-scale Internet media streaming." Circuits and Systems for Video Technology, IEEE Transactions on 18.12 (2008): 1692-1702.*

(Continued)

*Primary Examiner* — Harris Wang
(74) *Attorney, Agent, or Firm* — Coats & Bennett, PLLC

(57) ABSTRACT

A technique for determining usage of encrypted media content is described. A method implementation of this technique comprises the steps of obtaining a short-term key for decrypting the media content, obtaining a long-term key for decrypting the short-term key, decrypting the short-term key based on the long-term key, decrypting the media content based on the decrypted short-term key, and logging a parameter relating to the short-term key as a basis for determining media content usage. The short-term key may be a Traffic Encryption Key, TEK, and the long-term key may be a Service Encryption Key, SEK.

15 Claims, 6 Drawing Sheets

(56) References Cited

U.S. PATENT DOCUMENTS

| | | | |
|---|---|---|---|
| 8,259,936 B2* | 9/2012 | Benkert et al. | 380/45 |
| 2003/0172114 A1* | 9/2003 | Leung | 709/205 |
| 2004/0196975 A1* | 10/2004 | Zhu et al. | 380/258 |
| 2005/0281404 A1* | 12/2005 | Yu | 380/28 |
| 2006/0206708 A1* | 9/2006 | Son et al. | 713/163 |
| 2007/0274526 A1* | 11/2007 | Wang et al. | 380/277 |
| 2009/0285401 A1* | 11/2009 | Moroney et al. | 380/278 |
| 2010/0027787 A1* | 2/2010 | Benkert et al. | 380/45 |

OTHER PUBLICATIONS

Layered Encryption for Scalable Video Coding, Chunhua Li ; Dept. of Comput. Sci. & Technol., Tsinghua Univ., Beijing, China ; Chun Yuan ; Yuzhuo Zhong, Image and Signal Processing, 2009. CISP '09.*

Open Mobile Alliance, "Mobile Broadcast Services Architecture." Online, Feb. 12, 2009, pp. 1-109, XP002576077, [retrieved on Mar. 29, 2010]. Retrieved from the Internet: <URL: http://www.openmobilealliance.org/Technical/release_program/docs/BCAST/V1_0-20090212-A/OMA-AD-BCAST-V1_0-20090212-A.pdf>.

* cited by examiner

TECHNIQUE FOR DETERMINING USAGE OF ENCRYPTED MEDIA CONTENT

TECHNICAL FIELD

The present disclosure generally relates to a technique for determining usage of encrypted media content such as video, audio or multimedia content. In particular, the disclosure is directed to determining usage of encrypted media content which is encrypted based on a key management architecture that requires decrypting of at least one key for accessing the media content.

BACKGROUND

Modern media content distribution systems such as mobile video transmission systems are becoming increasingly popular. Bitstream scalability is a desirable feature in such systems. An encoded media bitstream is generally called scalable when parts of the bitstream can be removed so that the resulting sub-bitstream is still decodable by a target decoder. The media content of the sub-bitstream can be reconstructed at a quality that is less than that of the original bitstream, but still high when considering the resulting reduction of transmission and storage resources. Bitstreams that do not have these properties are also referred to as single-layer bitstreams.

Scalable Video Coding (SVC) is one solution to the scalability needs posed by the characteristics of video transmission systems. The SVC standard as specified in Annex G of the H.264/Advanced Video Coding (AVC) specification allows the construction of bitstreams that contain scaling sub-bitstreams conforming to H.264/AVC. H.264/AVC is a video compression standard equivalent to the Moving Pictures Expert Group (MPEG)-4 AVC (MPEG-4 AVC) standard.

The SVC standard encompasses different scalability concepts as described, for example, in H. Schwarz et al., "Overview of the Scalable Video Coding Extension of the H.264/AVC standard", IEEE Transactions on Circuits and Systems for Video Technology", Vol. 17, No. 9, September 2007. For spatial and quality bitstream scalability, i.e. the generation of a sub-bitstream with lower spatial resolution or quality than the original bitstream, Network Abstraction Layer (NAL) units are removed from the bitstream when deriving the sub-bitstream. In case of spatial and quality bitstream scalability, inter-layer prediction, i.e., the prediction of the higher spatial resolution or quality bitstream based on information contained in the lower spatial resolution or quality bitstream, is used for efficient encoding. For temporal bitstream scalability, i.e., the generation of a sub-bitstream with a lower temporal sampling rate than the original bitstream, complete access units are removed from the bitstream when deriving the sub-bitstream. An access unit is defined as a set of consecutive NAL units with specific properties. In the case of temporal bitstream scalability, high-level syntax and inter prediction reference pictures in the bitstream are constructed accordingly.

In the SVC standard, the sub-bitstream having a lower temporal sampling rate, lower spatial resolution or lower quality is referred to as Base Layer (BL) sub-bitstream, while the higher temporal sampling rate, higher spatial resolution or higher quality sub-bitstream is referred to as Enhancement Layer (EL) sub-bitstream. In scenarios with multiple sub-bitstreams of, for example, different higher spatial resolutions, two or more EL sub-bitstreams may be provided in total. Each sub-bitstream can be interpreted as constituting a separate media layer.

An image of an SVC video image sequence is represented as so-called "frame" (i.e., as an encoded representation of this image). Each SVC sub-bitstream comprises a sequence of so called SVC "sub-frames". Each SVC sub-frame constitutes either a full SVC frame or a fraction of a SVC frame. In other words, each SVC frame is either represented as a single data item (i.e., one BL "sub-frame" or one EL "sub-frame") or is sub-divided in at least two separate data items, i.e., in one BL "sub-frame" containing only the BL information associated with the respective frame and (at least) one EL "sub-frame" containing the EL information associated with the respective frame.

The scalability feature introduced by the SVC standard allows for a bitstream adaptation dependent on, for example, decoder capabilities, display resolutions and available transmission bit rates. If only the BL sub-frames are decoded, the video content can be rendered for example at a basis resolution or quality (e.g., at Quarter Video Graphics Array, or QVGA, resolution). If, on the other hand, both the BL and the EL sub-frames are decoded, then the video content can be rendered at a higher resolution or quality (e.g., at VGA resolution or High-Definition (HD) resolution).

In order to control the distribution and consumption of media content, for example, media content distributed based on the above described SVC standard, the media content can be protected with a Digital Rights Management (DRM) system. Under the DRM framework, content is securely distributed to and consumed by authorized recipients, for example authenticated user devices, per the usage right expressed by the content issuer (other names for content issuer include content provider, content owner, content distributor, and the like). The DRM framework is independent of content formats, operating systems, communication channels, and runtime environments. Content protected based on DRM can be a wide variety of media content like documents, images, ringtones, music clips, video clips, streaming media, games, and so on.

A known DRM system for content and service protection is included in Open Mobile Alliance (OMA) Mobile Broadcast Services Enabler Suit (BCAST). DRM components of OMA BCAST are described in document "Service and Content Protection for Mobile Broadcast Services", Approved Version 1.0, 12 Feb. 2009 by OMA. Therein, DRM Profile and Smartcard Profile are described as two main systems for providing service and content protection. OMA BCAST uses a four-layer model key management architecture for service and content protection.

FIG. 1 shows a block diagram of encrypted media content distribution between a server and a client. Encryption and decryption is carried out according to the OMA BCAST standard. The OMA BCAST four-layer model key management architecture is based on layers L1 to L4. In Layer L1, trust is established between server and client based on a Subscriber Management Key (SMK). SMK is a user key that is provided to the client based on the Generic Bootstrapping Architecture (GBA) protocol. GBA is described in document "Generic Authentication Architecture, Generic Bootstrapping Architecture (Release 6)" 3$^{rd}$ Generation Partnership Project, Technical Specification 3GPP TS 33.220. Based on the trusted relation between server and client, it is ensured that only trusted clients get access to Service Encryption Keys (SEK) in subscription management layer L2. SEK is a long-term key that is provided through a Long Term Key Message (LTKM) to the client. Based on the SMK, the SEK key can be encrypted and decrypted in layer L2. Similar to layer L2, in traffic key layer L3, a Traffic Encryption Key (TEK) is encrypted and decrypted based on the SEK. The TEK is a short-term key and is delivered through a Short Term Key Message (STKM). Although the term layer is used herein for layers L1 to L4 and the SVC layers, different layers are concerned.

SEK and TEK are distributed based on the Multimedia Internet KEYing (MIKEY) protocol, which is described in document "MIKEY: Multimedia Internet KEYing", RFC 3830, August 2004 by the Internet Engineering Task Force (IETF). One difference between SEK and TEK is that TEK typically changes more frequently than SEK. From this difference how long the TEK is valid in comparison to the validity of the SEK, the terms long-term key and short-term key are derived. In content layer L4, the media content is decrypted based on the TEK.

Content issuers providing DRM protected media content to clients (i.e., users) have an interest to know, which amount of media content is consumed by the client. Such data can be used by the content issuer to charge the user based on the consumed amount of media content. Moreover, in case of scaled media content distribution (for example, in accordance with the SVC standard), the content issuer has an interest to know, media content of which resolution or quality has been consumed by the client. Such data can be used by the content issuer to charge the user with different rates based on the consumed media content resolution or quality. Furthermore, since content issuers and network operators (which are physically delivering the media content via its networks to the client) are often unrelated companies, the content issuer has an interest to check whether the network operator distributes the media content with a guaranteed resolution or quality to the client. Since user charging and checking the network operator's media content distribution are critical for the content issuer, determination of encrypted media content usage is desired to be carried out in a tamper-proof manner.

However, no tamper-proof solution for determining usage of encrypted media content exists.

Document "Service and Content Protection for Mobile Broadcast Services", Approved Version 1.0, 12 Feb. 2009, by OMA discloses in Chapter 6.6.7.8 to transmit a "consumption_reporting_flag" in a LTKM. This flag can be used to determine SEK usage. However, since SEKs typically change in an infrequent manner, no conclusion on media content usage can be drawn based on the consumption_reporting_flag.

Document WO 2004/017560 A1 concerns a technique for monitoring digital content provided from a content provider over a network. However, this document provides no disclosure regarding how usage of digital content can be monitored in a tamper-proof manner.

SUMMARY

Accordingly, a technique for tamper-proof determination of usage of encrypted media content is needed.

According to a first aspect, a method for determining usage of encrypted media content is provided. The method comprises obtaining a short-term key for decrypting the media content, obtaining a long-term key for decrypting the short-term key, decrypting the short-term key based on the long-term key, decrypting the media content based on the decrypted short-term key, and logging a parameter relating to the short-term key as a basis for determining media content usage. As understood herein, media content comprises various content types including video content, audio content, text content, multimedia content, and so on. The media content may be encrypted based on a key management architecture that requires decrypting of at least one key for accessing the media content. The media content may also be encrypted based on a DRM system, e.g., based on OMA BCAST or any other multi-layer model key management architecture. The short-term key may be a TEK, e.g., a TEK provided in a STKM. The long-term key may be a SEK, e.g., a SEK provided in a LTKM. The short-term key may particularly be any key, the content of which typically changes more frequently than the content of the long-term key.

The logging of a parameter relating to the short-term key as a basis for determining media content usage may comprise at least one of logging the decrypting of the media content based on the decrypted short-term key, logging the decrypting of the short-term key, and logging the obtaining of the short-term key. All three events of decrypting of the media content based on the decrypted short-term key, decrypting of the short-term key, and obtaining of the short-term key may be used as a trigger for determining the media content usage. In other words, when the client wants to use the media content (e.g., play a video stream), the short-term key has to be obtained, the short-term key has to be decrypted, and the media content has to be decrypted based on the decrypted short-term key. Since the short-term key typically changes frequently (i.e., the short-term key is only valid for a short period of time), usage of media content by the client can be determined with a high accuracy based on a short-term key related parameter.

In case the encrypted media content is encrypted with separate short-term keys in at least two hierarchical layers, wherein hierarchically higher layers depend on hierarchically lower layers, a parameter relating to the short-term key of at least one hierarchical layer may be logged. The media content may be scalable media content, e.g., media content encrypted based on the SVC standard.

In one implementation, it is determined whether a processing relating to the short-term key of at least a first hierarchical layer that is hierarchically lower than a second hierarchical layer has been performed, and a parameter relating to the short-term key of the second hierarchical layer is logged if the processing relating to the short-term key of the at least one first hierarchical layer has been determined. The processing relating to the short-term key of at least a first hierarchical layer may be at least one of a logging of the obtaining of the short-term key of the first hierarchical layer, a logging of the decrypting of the short-term key of the first hierarchical layer, and a logging of the decrypting of the media content concerning the first hierarchical layer based on the decrypted short-term key of the first hierarchical layer. Since hierarchically higher layers depend on hierarchically lower layers, the determination whether a processing relating to the short-term key of at least a first hierarchical layer that is hierarchically lower than a second layer has been performed may be extended to determining whether a processing relating to the short-term keys of all hierarchical layers that are hierarchically lower than the second hierarchical layer has been performed.

According to another implementation, a parameter relating to the short-term key may be logged for each hierarchical layer. Thus, a complete overview regarding short-term key usage concerning all hierarchical layers can be obtained.

In order to obtain information regarding usage of encrypted media content, the parameters logged for at least two hierarchical layers may be correlated. Furthermore, in case a parameter relating to the short-term key is logged for more than two hierarchical layers, in particular, for each hierarchical layer, the logged parameters may be correlated in order to determine the usage of encrypted media content. In other words, after collecting and logging all relevant parameters, the parameters can be correlated and evaluated in order to determine usage of encrypted media content.

To further fine-tune the determination of media content usage in case the media content comprises audio and video information, the method may comprise the additional step of considering accessibility of the audio and video information for the correlating. Thus, based on usage of short-term keys permitting access to the audio and video content of the media content, it can be determined whether full quality media content has been used.

To facilitate handling of the parameters, the parameters may be logged in a media content log and thereafter accumulated in a media content usage report. In particular, by accumulating the media content log or a plurality of media content logs in a media content usage report, the size of the media content usage reports may be decreased, e.g., compressed. After the accumulation, the media content usage report may be forwarded, e.g., to a network instance further processing the media content usage report, like a charging centre.

In addition to the accumulation of the media content log, information regarding Quality of Experience (QoE) relating to the media content may be accumulated in the media content usage report. Such information regarding QoE may, for example, comprise information regarding data packet loss.

In order to prevent manipulation of the media content usage report during transmission, at least one of encrypting and digitally signing may be provided to the media content usage report prior to the forwarding.

According to another aspect, a computer program product is provided. The computer program product comprises program code portions for performing one or more of the steps of one or more of the method aspects described herein, when the computer program product is run on at least one computing device. The computer program product may be stored on a computer-readable recording medium, such as a permanent or re-writable memory, a CD-ROM, or a DVD. The computer program product may also be provided for download via one or more computer networks, such as the Internet, a cellular communications network or a wireless or a wired Local Area Network (LAN).

According to a still further aspect, a device for determining usage of encrypted media content is provided. The device comprises an obtaining unit for obtaining at least a short-term key and a long-term key, a decrypting unit for decrypting the short-term key based on the long-term key, and a logging unit for logging a parameter relating to the short-term key as a basis for determining media content usage. The device may further comprise another decrypting unit for decrypting the media content based on the decrypted short-term key. In case the encrypted media content is encrypted with separate keys in at least two hierarchical layers, wherein hierarchically higher layers depend on hierarchically lower layers, the logging unit may be configured to log a parameter relating to the short-term key of at least one hierarchical layer.

The device may also comprise a determining unit configured to determine whether a processing relating to the short-term key of at least a first hierarchical layer that is hierarchically lower than a second hierarchical layer has been performed. The logging unit may also be configured to log a parameter relating to the short-term key of the second hierarchical layer if the processing relating to the short-term key of at least the first hierarchical layer has been determined.

The device may further comprise a correlating unit configured to correlate the parameters logged for at least two hierarchical layers. The correlating unit may also be a separate device or the correlating unit may be provided in a separate device. Accordingly, the parameters may be obtained by the correlating unit, e.g., by a media content usage report.

According to another aspect, a DRM module comprising a device for determining usage of encrypted media content is provided. The DRM module may be a trusted DRM module. The DRM module may be included in a client. The DRM module may also be included in a terminal device, for example, a mobile phone, a Personal Digital Assistant (PDA), a personal computer, a game console, and so on. The terminal device or client may also comprise a DRM module and a media player. The DRM module and the media player may by separate units or the DRM module may be included in the media player. The DRM module and/or the media player may comprise a decrypting unit for decrypting the media content based on a decrypted short-term key. The DRM module may also comprise the correlating unit.

BRIEF DESCRIPTION OF THE DRAWINGS

In the following, the present technique will be described in more detail with reference to exemplary embodiments illustrated in the drawings, wherein.

DETAILED DESCRIPTION

In the following description, for purposes of explanation and not limitation, specific details are set forth such as specific device configurations and specific media content handling, storage and streaming scenarios in order to provide a thorough understanding of the technique disclosed herein. It will be apparent to one skilled in the art that the technique may be practised in other embodiments that depart from these specific details. Moreover, while the following embodiments will primarily be described in relation to the SVC, OMA BCAST and Universal Mobile Telecommunications System (UMTS) standards, it will be readily apparent that the techniques described herein may also be practised in context with other rights management solutions and encoding protocols, in particular non-scalable encoding schemes.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in a computer processor and a memory coupled to the processor, wherein the memory stores one or more programs that perform the steps discussed herein when executed by the processor.

Figure 1:
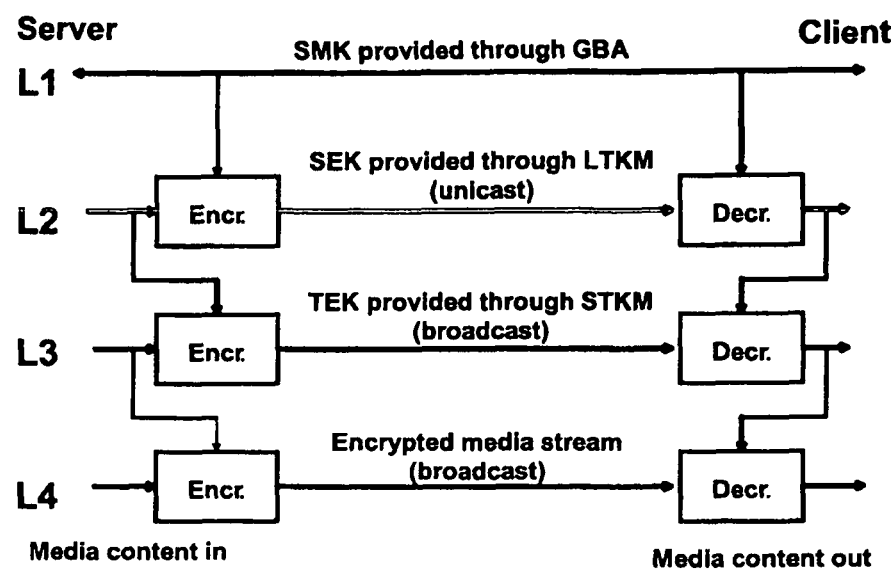
FIG. 1 is a schematic block diagram illustrating encrypted media content distribution between a server and a client based on OMA BCAST.
Figure 2:
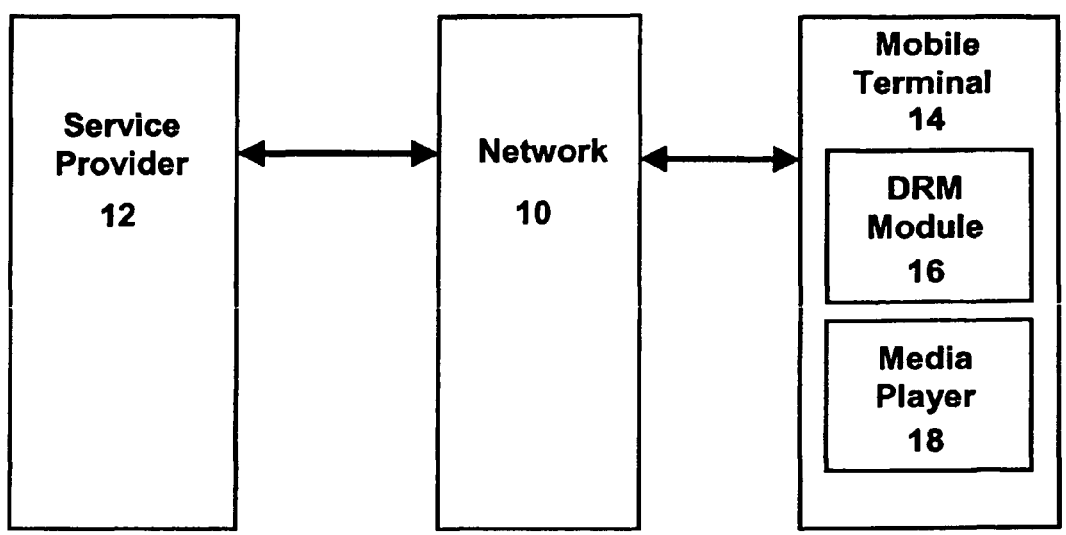
FIG. 2 is a schematic block diagram illustrating a first embodiment of a network in which usage of encrypted media content is determined.

Reference is now made to FIG. 2, which shows a schematic block diagram illustrating a first embodiment of a network 10 in which usage of encrypted media content is determined. Network 10 is an UMTS mobile communication network operated by a network operator. Via network 10, service provider 12 is communicating with mobile terminal 14. Service provider 12 and the network operator belong to different companies. Service provider 12 distributes via network 10 encrypted media content (e.g., encrypted video streams) to mobile terminal 14. Prior to the distribution, the media content has been encrypted by service provider 12 based on the OMA BCAST four-layer model key management architecture.

Mobile terminal 14 comprises a DRM module 16 and a media player 18. DRM module 16 and a media player 18 are communicating with each other. Although DRM module 16 and media player 18 are shown in FIG. 2 as two separates units, DRM module 16 and media player 18 may be combined in one unit or DRM module 16 may be included in media player 18.

A first method embodiment for determining usage of encrypted media content will now be explained with reference to FIG. 2 and flow chart 300 shown in FIG. 3.

In the first method embodiment, it is assumed that the encrypted media content has been received by mobile terminal 14 and a trusted relationship based on the OMA BCAST standard has been established between service provider 12 and mobile terminal 14. Since the received media content is encrypted in accordance with the OMA BCAST standard, media player 18 cannot play the media content. For decrypting the media content, media player 18 requires a respective short-term key TEK. Accordingly, media player 18 requests the TEK from DRM module 16. DRM module 16 receives this request. Since the TEK is initially encrypted, before providing the TEK to media player 18, DRM module 16 decrypts the TEK. The decrypting of the TEK is carried out in DRM module 16 by using a long-term key SEK.

Thus, for playing the media content with media player 18, in a first step 302, a TEK for decrypting the media content is obtained, and in a second step 304, a SEK for decrypting the TEK is obtained. The obtaining of the SEK and TEK may be carried out as described in document "Service and Content Protection for Mobile Broadcast Services", Approved Version 1.0, 12 Feb. 2009 by OMA, which is hereby incorporated by reference. The order of steps 302 and 304 may also be interchanged.

In step 306, DRM module 16 decrypts, triggered by the TEK request of media player 18, the TEK by using the SEK. After the decryption of the TEK, DRM module 16 provides the decrypted TEK to media player 18. By using the decrypted TEK, media player 18 decrypts in step 308 the media content. After the media content has been decrypted, media player 18 can play the media content, e.g., play a video stream.

In a subsequent step 310, a parameter relating to the TEK is logged in DRM module 16 as a basis for determining media content usage. Step 310 may comprise at least one of the steps of logging the obtaining of the TEK by DRM module 16 or media player 18, logging the decrypting of the TEK by the DRM module 16, and logging the decrypting of the media content based on the decrypted TEK by media player 18. Since the TEK changes frequently (i.e., the TEK is only valid for a relatively short period of time, for example, a few seconds), any of the events of obtaining the TEK, decrypting the TEK, and decrypting the media content based on the decrypted TEK is sufficient for triggering the determination of the media content usage with a high accuracy. Thus, DRM module 16 logs over time the parameter relating to the TEK in a media content log.

In a next step 312, the media content log is accumulated in a media content usage report. For this, a plurality of media content logs may in a compressed manner be accumulated in the media content usage report. In addition to the media content log, QoE related information (e.g., information gathered by media player 18 or information regarding data packet loss over network 10) may be accumulated into the media content usage report. The accumulation of QoE related information may be provided in a compressed manner in order to reduce the size of the media content usage report. The accumulation may be provided at a predetermined point of time, a predetermined period of time after a predetermined event (e.g., after the playing of the media content by media player 18 has ended), regularly at predetermined points of time, or upon receiving a trigger signal (e.g., from a DRM system). The period of time or the trigger for the accumulation may be provided in the license of the DRM system. Furthermore, whether logging of a parameter relating to the TEK is to be executed may be provided in the DRM license.

In a subsequent step 314, at least one of encrypting and digitally signing is provided to the media content usage report. Thus, the media content usage report is protected from manipulation during transmission via network 10. For encrypting the media content usage report, symmetric or asymmetric algorithms (e.g., in accordance with the Advanced Encryption Standard (AES) or RSA) may be used. The keys used for encrypting the media content usage report may be keys used by DRM module 16, may be derived from cryptographic information stored in DRM module 16, or may be dedicated keys used only for protecting the media content usage report. For digitally signing the media content usage report, a key-based Message Authentication Code (MAC) or a public key signature of a cryptographic hash over the media content usage report may be used. In particular, the keys for encrypting and/or digitally signing the media content usage report are chosen such that the service provider 12 possesses cryptographic credentials for decrypting and/or verifying authentication of the media content usage report.

In step 316, the encrypted and/or digitally signed media content usage report is sent via mobile network 10 to service provider 12. After service provider 12 has received the encrypted media content usage report from mobile terminal 14, service provider 12 decrypts the media content usage report and/or verifies its authenticity based on the MAC or the signature. In other words, service provider 12 checks whether the received media content usage report is original and not tampered.

After analyzing of the received media content usage report, service provider 12 may charge the user of mobile terminal 14 based on the usage of media content. Service provider 12 may also gather a plurality of media content usage reports from a plurality of mobile terminals (not shown in FIG. 2) and may check whether the network operator obeys to the quality requirements agreed upon in the service agreement between the network operator and the service provider 12. The media content usage report may also be used by service provider 12 for other purposes like audience measurements. For this, the media content usage report may be anonymized.

Figure 4:
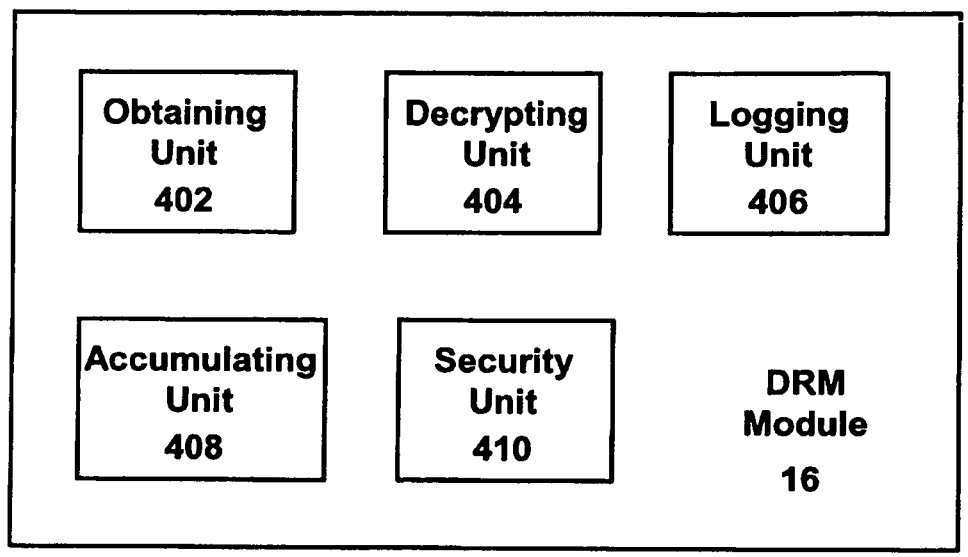
FIG. 4 is a schematic block diagram illustrating an embodiment of a DRM module.

FIG. 4 is a block diagram schematically illustrating an embodiment of DRM module 16 included in mobile terminal 14 shown in FIG. 2.

DRM module 16 comprises an obtaining unit 402 for obtaining a short term key TEK and a long term key SEK, a decrypting unit 404 for decrypting the short-term key TEK based on the long term key SEK, a logging unit 406 for logging a parameter relating to the short-term key TEK in a media content log, an accumulating unit 408 for accumulating the media content log in a media content usage report, and a security unit 410 for providing at least one of encrypting and digitally signing to the media content usage report. The security unit 410 may also be configured to provide at least one of encrypting and digitally signing to the media content log.

Figure 5:
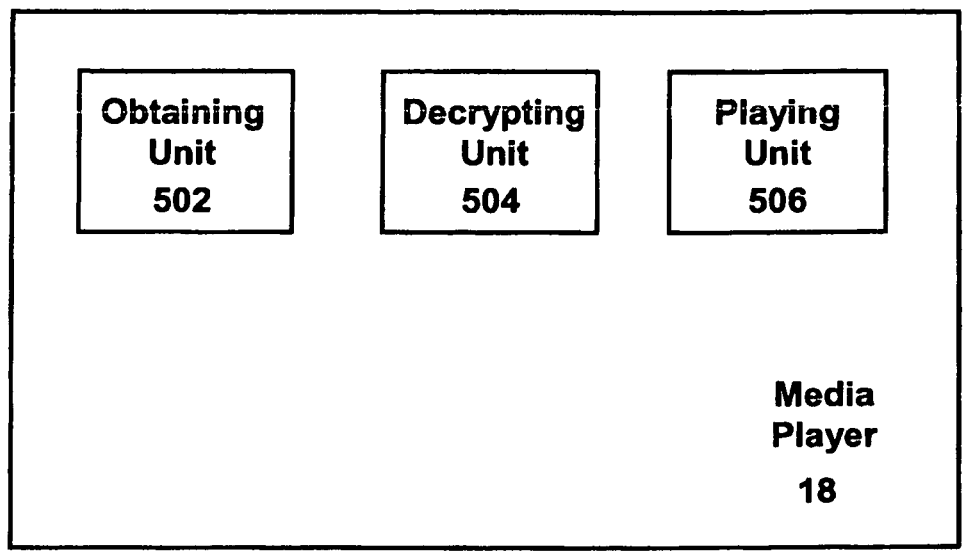
FIG. 5 is a schematic block diagram illustrating an embodiment of a media player.

FIG. 5 is a block diagram schematically illustrating an embodiment of media player 18 included in mobile terminal 14 shown in FIG. 2. Media player 18 comprises an obtaining unit 502 for obtaining a decrypted short-term key TEK from DRM module 16, a decrypting unit 504, for decrypting the media content based on the decrypted short-term key TEK, and a playing unit 506 for playing the decrypted media content. Playing unit 506 may for example be a video player plug-in for an Internet browser.

Figure 6:
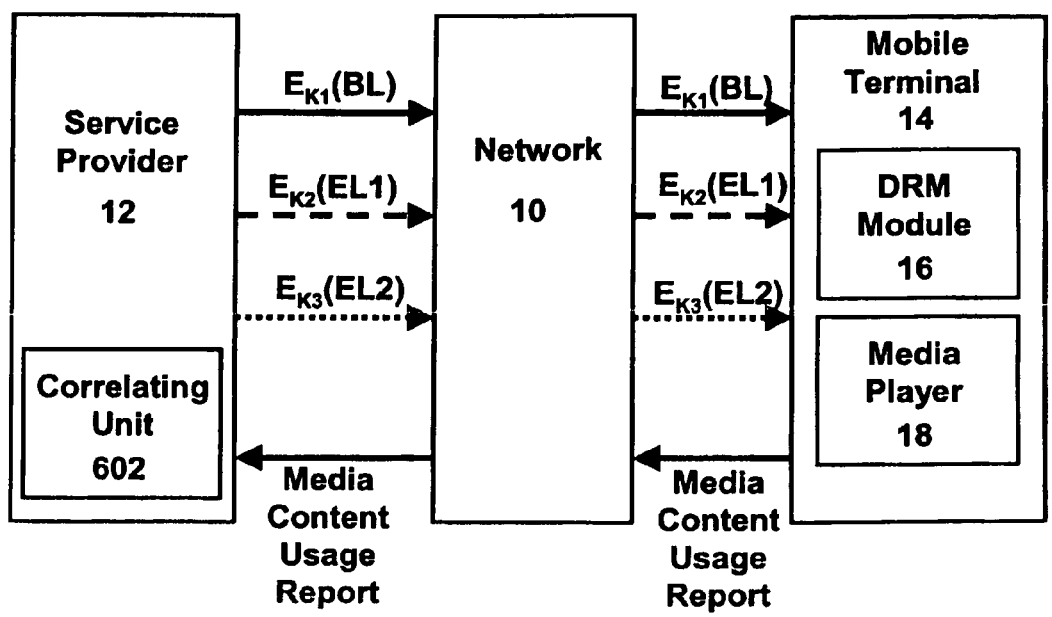
FIG. 6 is a schematic block diagram illustrating a second embodiment of a network in which usage of encrypted media content is determined.

With reference to FIG. 6, a second embodiment of a technique for determining usage of encrypted media content is explained. FIG. 6 shows a schematic block diagram illustrating a second embodiment of network 10 in which usage of encrypted media content is determined.

The embodiment according to FIG. 6 differs from the embodiment according to FIG. 2 in that scalable media content encoded according to the SVC standard is provided by service provider 12 via network 10 to mobile terminal 14. In particular, the encrypted media content is distributed via a Base Layer (BL), a first Enhancement Layer (EL1), and a second Enhancement Layer (EL2). Each of layers BL, EL1 and EL2 is protected based on the OMA BCAST standard with separate keys. In other words, each layer BL, EL1 and EL2 is separately content protected by using different encryption keys. Layers BL, EL1 and EL2 are hierarchical layers. Layer EL1 depends on layer BL and layer EL2 depends on layers EL1 and BL. If, for example, video media content having a high resolution (e.g., VGA) is to be played by media player 18, decrypting of all three layers BL, EL1 and EL2 is necessary. In case only a basic video resolution (e.g., QVGA) is to be played by media player 18, only layer BL has to be decrypted.

In this embodiment, the media content of layer BL is encrypted with short-term key K1, the media content of layer EL1 is encrypted with short-term key K2, and the media content of layer EL2 is encrypted with short-term key K3. Accordingly, designation $E_X(Y)$ in FIG. 6 indicates an encrypted representation of a media layer "Y" using encryption key "X". The dashed arrows $E_{K2}(EL1)$ and the dotted arrows $E_{K3}(EL2)$ between service provider 12 and mobile terminal 14 indicate that EL1 and EL2 may only be partly or selectively transmitted to mobile terminal 14, for example, because the network operator uses adaptive video streaming in network 10.

Thus, users only purchasing the basic quality media content (e.g., QVGA videos) will only get access to and the respective keys for layer BL, whereas users purchasing the enhanced quality media content (e.g., VGA videos) will get access to and the respective keys of layers EL1 and EL2. Since short-term keys K1, K2 and K3 change frequently (usually every few seconds), usage of media content in accordance with the respective layers BL, EL1 and EL2, i.e., in accordance with the consumed quality of media content, can be determined with high accuracy.

Figure 3:
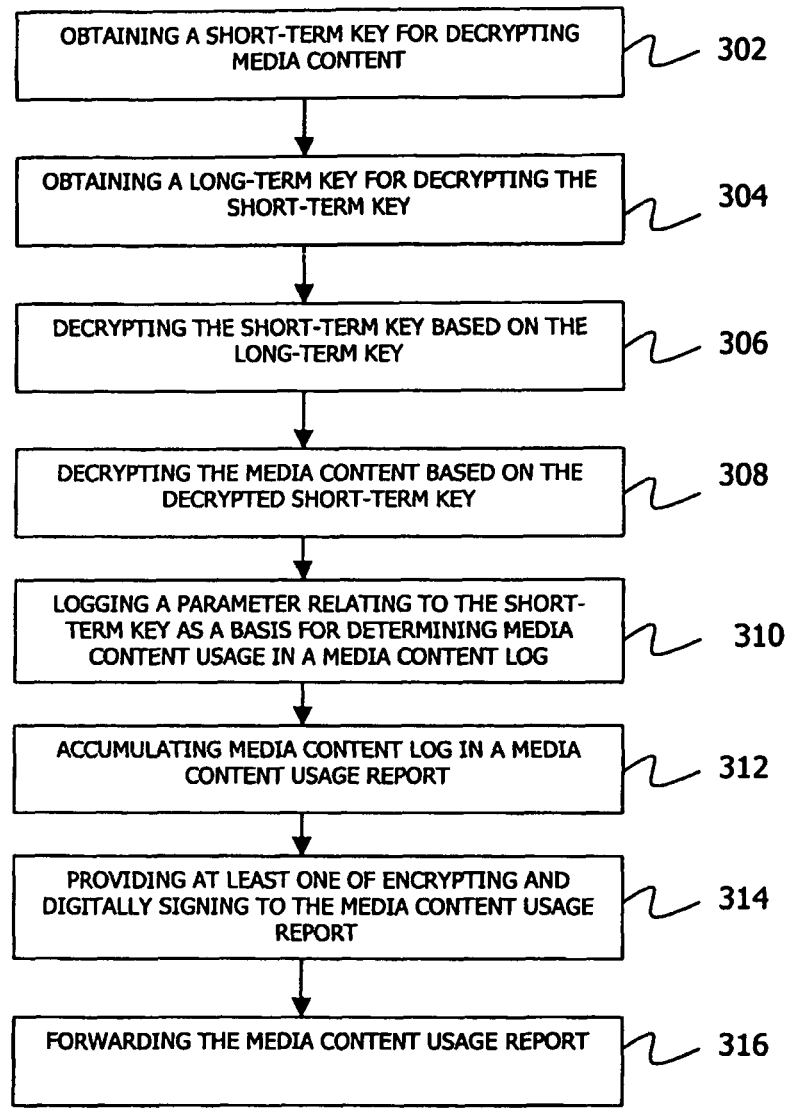
FIG. 3 is a schematic flow chart illustrating a first method embodiment concerning determination of usage of encrypted media content.

A first method implementation of the technique for determining usage of encrypted media content illustrated in FIG. 6 is based on the method shown in flowchart 300 of FIG. 3. Since the media content of layer EL1 depends on the media content of layer BL and the media content of layer EL2 depends on the media content of layer EL1 and layer BL, the method shown in flowchart 300 of FIG. 3 is amended such that in method step 310, the parameter relating to the short-term key of a hierarchical higher layer is only logged for a certain period of time if the short-term key of an hierarchical layer that is lower than the aforementioned hierarchical layer has been obtained, decrypted, and/or media content is decrypted based on the decrypted short-term key. The other method steps shown in flowchart 300 may remain unchanged.

For example, usage of short-term key K3 is only logged for a particular period of time in case a processing relating to short-term key K2 and a processing relating to short-term key K1 has been provided. The processing may for example be at least one of that the keys K1 and/or K2 have been obtained, that the keys K1 and/or K2 have been decrypted, and that BL media content and/or EL1 media content has been decrypted based on the K1 and K2 keys. The aforementioned triggering conditions may also be mixed. For example, the triggering condition for the selective logging may be that short-term key K2 has been obtained and that short-term key K1 has been decrypted. Since the logging is only provided selectively if certain conditions are fulfilled, the size of the media content usage report sent by mobile terminal 14 to service provider 12 can be reduced.

An alternative second method implementation of the technique for determining usage of encrypted media content illustrated in FIG. 6 is based on the method shown in flowchart 300 of FIG. 3. According to the second method implementation, method step 310 of flowchart 300 is amended such that parameters relating to short-term keys K1, K2 and K3 are independently logged for each of layers BL, EL1 and EL2. Thus, parameters relating to the short-term keys of layers BL, EL1 and EL2 are logged in separate media content logs over time. After the logging, the media content logs are accumulated in at least one media content usage report. The accumulated media content usage report is thereafter encrypted and digitally signed. Then, the media content usage report is forwarded by mobile terminal 14 via network 10 to service provider 12. The other method steps shown in flowchart 300 may remain unchanged.

Service provider 12 comprises a correlating unit 602. Correlating unit 602 correlates the media content usage data included in the received media content usage report. Correlating unit further correlates information regarding usage of audio and video data by media player 18. Contrary to the embodiment of FIG. 6, correlating unit 602 may also be provided in mobile terminal 14, e.g., in DRM module 16, and correlated key usage reports may be sent by mobile terminal 14 to service provider 12.

According to the present technique for determining usage of encrypted media content, usage of short-term keys is considered in a DRM module. In case media content consumption is charged to the user subject to media content quality (e.g., cheap QVGA resolution and more expensive VGA resolution), the lower the consumed media content quality reported to the service provider, the lower is the cost charged to the user. Therefore, the user may try to manipulate the media content log or the media content usage report so that lower media content quality consumption is reported. However, according to the present technique, such manipulation of the media content log or the media content usage report, or a manipulation of the parameter logging is not possible. Furthermore, by correlating parameters relating to usage of short-term keys corresponding to different hierarchical layers and taking the hierarchy of the layers into account, precise reporting can be achieved with respect to the actually consumed media content quality.

In the foregoing, principles, embodiments and various modes of implementing the techniques disclosed herein have been exemplarily described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method for determining usage of encrypted media content encrypted with separate short-term keys in at least two hierarchical layers, wherein the hierarchically higher layers depend on hierarchically lower layers, the method comprising:
   Obtaining media content of a base layer (BL1) encrypted with a first short-term key (K1);
   Obtaining media content of a first enhancement layer (EL1) encrypted with a second short-term key (K2);
   obtaining short-term keys (K1, K2) for decrypting the media content in at least two hierarchical layers, wherein the at least two hierarchical layers comprise at least one Base Layer (BL1) and at least a first Enhancement Layer (EL1), wherein Layer EL1 depends on layer BL1;
   obtaining at least one long-term key for decrypting the short-term keys, wherein the short term keys are valid for a shorter period of time than the at least one long-term key;
   decrypting the short-term keys based on the at least one long-term key;
   decrypting at least one hierarchical layer of the media content based on at least one of the decrypted short-term keys;
   logging usage of at least one of the short-term keys as a basis for determining usage of the media content; and logging a parameter relating to the short-term key of at least one hierarchical layer.

2. The method of claim 1 wherein the short-term keys comprise Traffic Encryption Keys and the at least one long-term key comprises a Service Encryption Key.

3. The method of claim 1 further comprising logging the decrypting of the at least one hierarchical layer of the media content based on at least one of the decrypted short-term keys.

4. The method of claim 1 further comprising logging the decrypting of the short-term keys.

5. The method of claim 1 further comprising:
   logging at least one parameter relating to the short-term key of at least one hierarchical layer in a media content log;
   accumulating the media content log in a media content usage report;
   forwarding the media content usage report.

6. A computer program product stored in a non-transitory computer readable medium for controlling a computing device to aid in determining usage of encrypted media content encrypted with separate short-term keys in at least two hierarchical layers, wherein the hierarchically higher layers depend on hierarchically lower layers, the computer program product comprising software code instructions which, when run on the computing device, causes the computing device to:
   Obtain media content of a base layer (BL1) encrypted with a first short-term key (K1);
   Obtain media content of a first enhancement layer (EL1) encrypted with a second short-term key (K2);
   obtain short-term keys (K1, K2) for decrypting the media content in at least two hierarchical layers, wherein the at least two hierarchical layers comprise at least one Base Layer (BL1) and at least a first Enhancement Layer (EL1), wherein Layer ED depends on layer BL1;
   obtain at least one long-term key for decrypting the short-term keys, wherein the short term keys are valid for a shorter period of time than the at least one long-term key;
   decrypt the short-term keys based on the at least one long-term key; decrypt at least one hierarchical layer of the media content based on at least one of the decrypted short-term key;
   log usage of at least one of the short-term keys as a basis for determining usage of the media content; and log a parameter relating to the short-term key of at least one hierarchical layer.

7. The computer program product of claim 6 wherein the short-term keys comprise Traffic Encryption Keys and the at least one long-term key comprises a Service Encryption Key.

8. The computer program product of claim 6 wherein the software code instructions, when run on the computing device, further cause the computing device to log the decrypting of the at least one hierarchical layer of the media content based on at least one of the decrypted short-term keys.

9. The computer program product of claim 6 wherein the software code instructions, when run on the computing device, further cause the computing device to log the decrypting of the short-term keys.

10. The computer program product of claim 6 wherein the software code instructions, when run on the computing device, further cause the computing device to:
    log at least one parameter relating to the short-term key of at least one hierarchical layer in a media content log;
    accumulate the media content log in a media content usage report; and
    forward the media content usage report.

11. A device for determining usage of encrypted media content encrypted with separate short-term keys in at least two hierarchical layers, wherein the hierarchically higher layers depend on hierarchically lower layers, the device comprising:
    an obtaining circuit configured to obtain media content of a base layer (BL1) encrypted with a first short-term key (K1), media content of a first enhancement layer (EL1) encrypted with a second short-term key (K2), at least short-term keys (K1, K2) for decrypting the media content in at least two hierarchical layers and at least one a long-term key for decrypting the short-term keys, wherein the at least two hierarchical layers comprise at least one Base Layer (BL1) and at least a first Enhancement Layer (EL1), wherein Layer ED depends on layer BL1, wherein the short term keys are valid for a shorter period of time than the at least one long-term key;
    a decrypting circuit configured to decrypt the short-term keys based on the at least one long-term key, and to decrypt at least one hierarchical layer of the media content based on at least one of the decrypted short-term keys;
    a logging circuit configured to log usage of at least one of the short-term keys as a basis for determining media content usage and to log a parameter relating to the short-term key of at least one hierarchical layer.

12. The device of claim 11 wherein the device is a Digital Rights Management module.

13. The method of claim 1, further comprising
    determining whether a processing relating to the short-term key of at least a first hierarchical layer that is hierarchically lower than a second hierarchical layer has been performed; and logging a parameter relating to the short-term key of the second hierarchical layer if the processing relating to the short-term key of the at least one first hierarchical layer has been determined.

14. The method of claim 1, further comprising logging for each hierarchical layer a parameter relating to the short-term key.

15. The method of claim 1, further comprising correlating the parameters logged for at least two hierarchical layers.

\* \* \* \* \*